(12) United States Patent
Smith et al.

(10) Patent No.: US 10,196,136 B2
(45) Date of Patent: Feb. 5, 2019

(54) CABLE CUTTER SYSTEM

(71) Applicant: Bell Helicopter Textron Inc., Fort Worth, TX (US)

(72) Inventors: Michael Smith, Colleyville, TX (US); Cheng-Ho Tho, Irving, TX (US); Anand Kumar Marimuthu, Bangalore (IN)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 38 days.

(21) Appl. No.: 15/630,535

(22) Filed: Jun. 22, 2017

(65) Prior Publication Data

US 2017/0291698 A1 Oct. 12, 2017

Related U.S. Application Data

(63) Continuation of application No. 14/506,286, filed on Oct. 3, 2014, now Pat. No. 9,725,165.

(51) Int. Cl.
| | |
|---|---|
| *B64C 27/00* | (2006.01) |
| *B26D 1/25* | (2006.01) |
| *B26D 1/12* | (2006.01) |
| *B26D 1/00* | (2006.01) |

(52) U.S. Cl.
CPC ............ *B64C 27/006* (2013.01); *B26D 1/12* (2013.01); *B26D 1/25* (2013.01); *B26D 2001/006* (2013.01); *B26D 2001/0066* (2013.01)

(58) Field of Classification Search
CPC .... B26D 1/12; B26D 1/25; B26D 2001/0066; B26D 2001/006
See application file for complete search history.

(56) References Cited

U.S. PATENT DOCUMENTS

| | | | | |
|---|---|---|---|---|
| 72,299 | A * | 12/1867 | Hull ......................... | A01G 3/04 56/237 |
| 156,748 | A * | 11/1874 | Andrews .............. | B23D 61/021 83/846 |
| 205,103 | A * | 6/1878 | KNowles ............. | B23D 29/023 30/240 |
| 785,225 | A * | 3/1905 | Manly .................. | B23D 29/023 30/240 |

(Continued)

FOREIGN PATENT DOCUMENTS

| | | |
|---|---|---|
| CA | 977792 | 11/1975 |
| DE | 431733 | 7/1926 |

(Continued)

OTHER PUBLICATIONS

European Patent Office, European Search Report for EP Appl. No. 15187779.2 dated Jan. 7, 2016, 4 pp.

(Continued)

*Primary Examiner* — Sean M Michalski
(74) *Attorney, Agent, or Firm* — Daniel J. Chalker; Edwin S. Flores; Chalker Flores, LLP

(57) ABSTRACT

Some examples of a cable cutting system include a first cutting apparatus that includes a recess to receive a cable. The system includes a second cutting apparatus separate from and attached to the first cutting apparatus. The second cutting apparatus includes multiple cutting surfaces arranged to cut the cable received at the recess.

13 Claims, 11 Drawing Sheets

(56) References Cited

U.S. PATENT DOCUMENTS

| | | | | |
|---|---|---|---|---|
| 1,122,742 A * | 12/1914 | Halbach | B60R 19/545 | 114/221 A |
| 1,181,223 A * | 5/1916 | Holm | F41C 9/085 | 30/142 |
| 1,211,779 A * | 1/1917 | Steinmetz | F41C 27/20 | 30/1 |
| 1,265,151 A * | 5/1918 | Wilczek | B26B 13/22 | 30/102 |
| 1,289,196 A * | 12/1918 | Koszkowski | B60R 19/545 | 30/228 |
| 1,520,529 A * | 12/1924 | Cagle | A01G 3/02 | 30/254 |
| 1,614,856 A * | 1/1927 | Overbeck, Jr. | B60R 19/545 | 280/762 |
| 1,689,648 A * | 10/1928 | Voleske | B26B 17/02 | 30/179 |
| 1,731,607 A * | 10/1929 | Bianchi | A01G 3/04 | 56/235 |
| 1,882,195 A * | 10/1932 | Sharp | A01D 34/46 | 56/294 |
| 2,335,952 A | 12/1943 | Martin | | |
| 2,557,506 A * | 6/1951 | Kovacevich | A01G 3/0251 | 30/259 |
| 2,645,010 A * | 7/1953 | Holmes | A01G 3/0535 | 30/144 |
| 2,975,518 A * | 3/1961 | Nelson | A01G 3/02 | 30/250 |
| 3,352,012 A * | 11/1967 | Link | B23D 29/023 | 30/246 |
| 3,587,172 A * | 6/1971 | Link | B23D 29/023 | 30/246 |
| 3,688,139 A * | 8/1972 | Yaguchi | A47L 11/38 | 15/29 |
| 3,712,349 A * | 1/1973 | Toki | B23D 61/025 | 144/218 |
| 3,743,316 A * | 7/1973 | Stotesbery | B60R 19/54 | 180/182 |
| 3,841,656 A * | 10/1974 | Kramb | B60R 19/545 | 180/182 |
| 3,981,077 A * | 9/1976 | Manabe | A01G 3/067 | 30/233 |
| 4,215,833 A * | 8/1980 | Chan | B64C 27/006 | 244/17.11 |
| 4,368,610 A * | 1/1983 | Aono | A01D 34/73 | 30/347 |
| 4,434,555 A * | 3/1984 | Stoll | B26D 3/169 | 30/179 |
| 4,545,186 A * | 10/1985 | MacCanna | A01G 18/70 | 56/327.1 |
| 4,693,157 A * | 9/1987 | Looser | B26D 1/0006 | 83/431 |
| 4,826,103 A | 5/1989 | McKown | | |
| 4,889,025 A * | 12/1989 | Collett | B23D 61/028 | 144/241 |
| 5,288,036 A * | 2/1994 | Kompare | B64C 27/006 | 114/221 A |
| 5,308,114 A * | 5/1994 | Williams | B60R 19/545 | 219/202 |
| 5,415,364 A * | 5/1995 | Grant | B64C 27/006 | 244/121 |
| 5,475,927 A * | 12/1995 | Dorma | B23D 61/025 | 30/249 |
| D458,283 S * | 6/2002 | Stanley | B23D 61/025 | D15/139 |
| 7,343,725 B2 * | 3/2008 | Kendall | A01D 34/835 | 56/12.7 |
| 7,882,774 B1 * | 2/2011 | Bernardy | B23D 61/021 | 30/276 |
| 8,281,492 B1 * | 10/2012 | Toth | B26D 3/169 | 30/179 |
| 9,114,873 B2 | 8/2015 | Claeys | | |
| 2014/0054414 A1 | 2/2014 | Kosie et al. | | |

FOREIGN PATENT DOCUMENTS

| | | |
|---|---|---|
| EP | 3002216 A1 | 4/2016 |
| SU | 712483 A1 | 1/1980 |
| WO | 1991/005639 A1 | 5/1991 |

OTHER PUBLICATIONS

European Patent Office, Communication pursuant to Article 94(3) for EP Appl. No. 15187779.2 dated Jan. 26, 2016, 9 pp.

European Patent Office, Invitation pursuant to Article 94(3) and Rule 71(1) EPC for EP Application No. 15187779.2 dated Aug. 4, 2016, 6 pp.

* cited by examiner

CABLE CUTTER SYSTEM

CROSS-REFERENCE TO RELATED APPLICATIONS

This application claims priority to and is a continuation patent application of U.S. patent application Ser. No. 14/506,286, filed on Oct. 3, 2014, which is hereby incorporated by reference in its entirety.

TECHNICAL FIELD

This disclosure relates to cutting cables, e.g., cables encountered by vehicles during motion.

BACKGROUND

A vehicle in motion, e.g., an aircraft in flight, can sometimes encounter and inadvertently be impacted by cables in the part of the vehicle's motion. The cable can be, for example, a telephone cable, an electricity cable, or other cable. A cable cutting device can be installed on the vehicle to cut the cable in such a situation. In the example of an aircraft, such as a helicopter, the cable cutting device can protect the main rotor mast and associated linkages of the helicopter from cable strikes. Similar devices can also be used on fixed wing aircrafts and/or other vehicles.

SUMMARY

This disclosure describes a cable cutter system.

In some aspects, a cable cutting system includes a first cutting apparatus comprising a recess to receive a cable. The system includes a second cutting apparatus separate from and attached to the first cutting apparatus. The second cutting apparatus includes multiple cutting surfaces arranged to cut the cable received at the recess.

This, and other aspects, can include one or more of the following features. The system can be an aircraft cable cutting system. The second cutting apparatus can include a cutter wheel having a circumferential surface on which multiple cutting surfaces are arranged equidistantly. The cutter wheel can include five cutting surfaces. A space between adjacent cutting surfaces can be recessed to receive the cable. The cutter wheel can include a pivot position about which the cutter wheel can rotate to cut the cable received in the space. The multiple cutting surfaces can be multiple second cutting surfaces. The first cutting apparatus can include multiple first cutting surfaces positioned in the recess. The pivot position can be behind a position in the recess that provides a minimum clearance for the multiple first cutting surfaces to cut the cable. The second cutting apparatus can include a first cutting member and a second cutting member arranged to pivot about an axis that is perpendicular to the first cutting apparatus. A spring member in an energized state can be connected to the first cutting member. The spring member can force the first cutting member and the second cutting member toward each other in response to the cable being received between the first cutting member and the second cutting member. The first cutting member can be arranged above the second cutting member. The spring member can be connected to the second cutting member. The spring member can include a trigger structure to release the spring member from the energized state to a de-energized state. The first cutting member and the second cutting member can form a four bar mechanism with a first support bar and a second support bar to force the first cutting member and the second cutting member toward each other in response to the cable being received between the first cutting member and the second cutting member. The second cutting apparatus can include a first cutting member comprising a first cutting surface and a second cutting member comprising a second cutting surface. The first cutting surface and the second cutting surface can continuously move to the cut the cable. The second cutting apparatus can include a movement generator connected to the first cutting member and the second cutting member. The movement generator can continuously move the first cutting surface and the second cutting surface in response to receiving the cable between the first cutting member and the second cutting member. The movement generator can be a torsion spring or an electric motor. A sensor can be connected to the first cutting member. The sensor can provide a signal to the movement generator in response to receiving the cable between the first cutting member and the second cutting member. The sensor can include a piezoelectric device.

Some aspects of the subject matter described here can be implemented as an aircraft cable cutting system. The system includes a first cutting apparatus that includes a recess to receive a cable, and a first cutting surface positioned in the recess. The system includes a second cutting apparatus separate from and attached to the first cutting apparatus. The second cutting apparatus includes a second cutting surface arranged adjacent the first cutting surface. The first cutting surface and the second cutting surface cut the cable received at the recess.

This, and other aspects, can include one or more of the following features. The second cutting apparatus can include a cutter wheel having a circumferential surface on which five cutting surfaces are arranged equidistantly. The cutter wheel can be attached to the first cutting apparatus at a pivot position to pivot the five cutting surfaces around the recess. The second cutting apparatus can include a first cutting member, a second cutting member, and a spring member in an energized state. The second cutting member can include the second cutting surface arranged to pivot about an axis that is perpendicular to the first cutting apparatus. The spring member in the energized state can be connected to the first cutting member. The spring member can force the first cutting member and the second cutting member toward each other in response to the cable being received between the first cutting member and the second cutting member. The second cutting apparatus can include a first cutting member comprising a first cutting surface and a second cutting member comprising the second cutting surface. The first cutting surface and the second cutting surface can continuously move to the cut the cable. The second cutting apparatus can include a movement generator connected to the first cutting member and the second cutting member. The movement generator can continuously move the first cutting surface and the second cutting surface in response to receiving the cable between the first cutting member and the second cutting member.

Some aspects of the subject matter described here can be implemented as a method to cut a cable encountered by an aircraft. A cable is received in a recess formed in a first cutting apparatus. The cable is cut against a cutting surface of a second cutting apparatus separate from and attached to the first cutting apparatus. The cutting surface is positioned near the recess.

This, and other aspects, can include one or more of the following features. A force can be applied on the cutting surface of the second cutting apparatus to cut the cable.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a cable cutter system. Cables, e.g., telephone cables, electricity cables, or other cables, represent a significant danger for vehicles in motion, e.g., aircrafts. Aircrafts, e.g., medical aircrafts, flying at low altitudes and/or in cities, run the risk of encountering cables. One system for dealing with such cables includes a cable cutter positioned at the front of the aircraft. The cable cutter includes a guiding surface that guides the cable cutting edges positioned in a recess. When the aircraft strikes a cable, the cable slides along the guiding surface towards the recess. The aircraft's momentum (product of mass and velocity) forces the cable into the cable cutting edge positioned in the recess, thereby reducing the cables cross-sectional area until the cable's ultimate stress is exceeded and the cable breaks. The forward momentum of the aircraft rapidly decreases as the cable cutter cuts the cable. Such a rapid decrease in momentum can cause discomfort and potential injuries to the passengers of the aircraft. Also, in some cases, the forward momentum of the aircraft may not be sufficient for the cable cutter to cut the cable.

The cable cutter system described here incorporates activated cutters into the cable cutter described above to minimize forces acting against the aircraft. The cable cutter system described here can effectively cut cables even at low helicopter velocities. The inclusion of the activated cutters to the cable cutter system described above can allow the cable cutter system to cut cables having high ultimate stresses, e.g., cables that have larger diameters than cables that existing cutter systems are designed to cut. In sum, the cable cutter system described here can provide mechanical advantages and reduce the tensile load required to cut the cable, which, in turn, can reduce a risk to the aircraft and enable the cable to be correct at low aircraft velocities.

Figure 1:
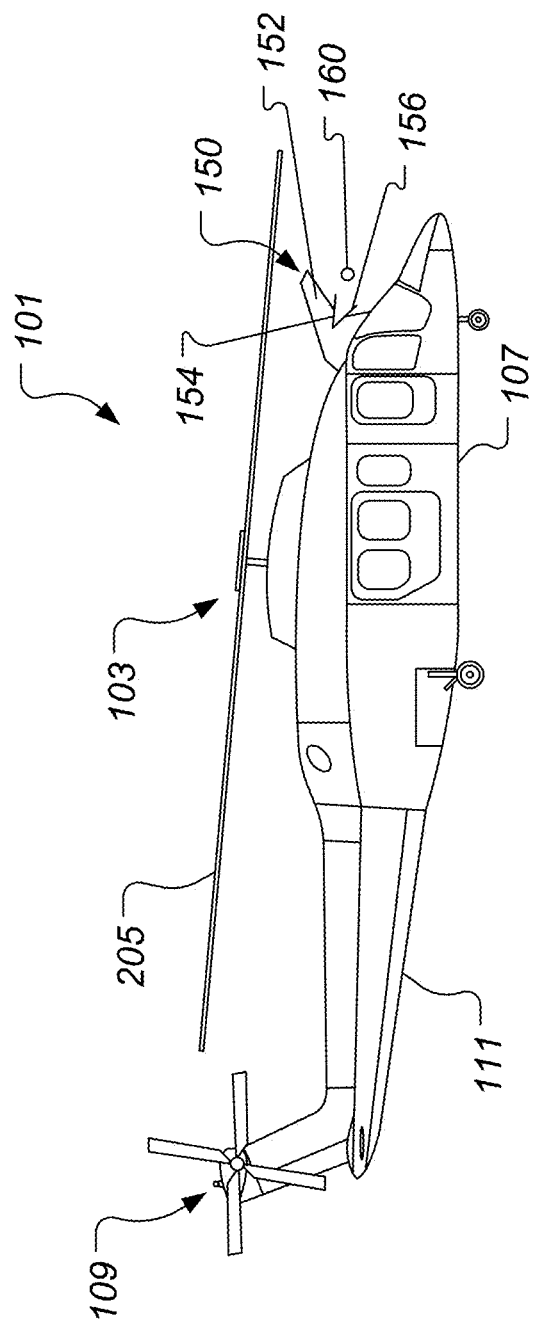
FIG. 1 is a schematic diagram of an example aircraft including an example cable cutter system.

FIG. 1 is a schematic diagram of an example aircraft 101 including an example cable cutter system 150 for cutting a cable 160. The aircraft 101, e.g., a rotorcraft, has a rotor system 103 with multiple rotor blades 205. The pitch of each rotor blade 205 can be manipulated in order to selectively control direction, thrust, and lift of rotorcraft 101. Rotorcraft 101 can further include a fuselage 107, anti-torque system 109, and an empennage 111. The cable cutter system 150 includes a first cutting apparatus 152, which includes a recess 154 to receive the cable 160. The cable cutter system 150 includes a second cutting apparatus, which is described with reference to the following figures. As described below, the second cutting apparatus includes multiple cutting surfaces arranged to cut the cable received at the recess in cooperation with the first cutting apparatus.

Figure 2C:
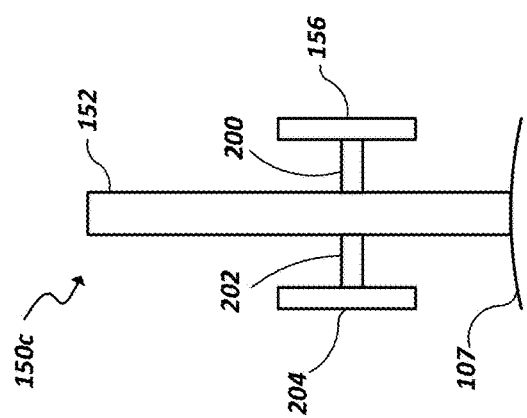
FIGS. 2A-2C are schematic diagrams of side views of example cable cutter systems.
Figure 2B:
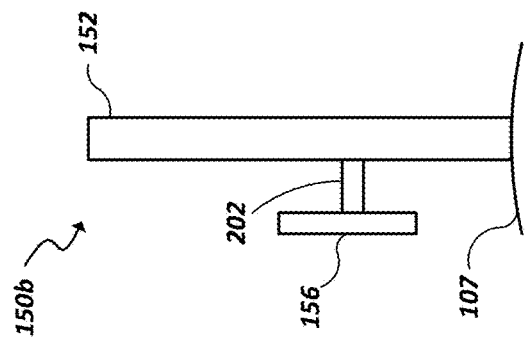
Figure 2A:
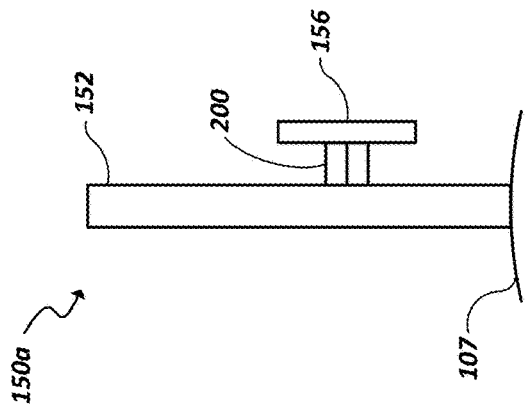

FIGS. 2A-2C are schematic diagrams of side views of example cable cutter systems. FIG. 2A shows a side view of an example cable cutter system 150a in which the second cutting apparatus 156 is attached on one side of the first cutting apparatus 152. For example, a rod member 200 can connect the first cutting apparatus 152 and the second cutting apparatus 156. The second cutting apparatus 156 can rotate about an axis of the rod member 200. FIG. 2B shows a side view of an example cable cutter system 150b in which the second cutting apparatus 156 is attached to the opposite side of the first cutting apparatus 152 relative to FIG. 2A using a rod member 202, which is structurally similar to the rod member 200. FIG. 2C shows a side view of an example cable cutter system 150c in which the second cutting apparatus 156 is attached to one side of the first cutting apparatus 152 using a rod member 200 and another cutting apparatus 204 is attached to the opposite side of the first cutting apparatus 152 using a rod member 202. In each of FIGS. 2A-2C, the cable cutter system including the first and second cutting apparatuses is attached to a surface of the vehicle, e.g., the fuselage 107 of the aircraft 101. In some implementations, the second cutting apparatus 156 can be arranged between the first cutting apparatus 152 and the other cutting apparatus 204. Example implementations of the second cutting apparatus are described with reference to the following figures. Any implementation of the second cutting apparatus described below can be attached to the first cutting apparatus 152. In addition, two or more different implementations of the second apparatuses described below can be attached to the first cutting apparatus 152.

FIGS. 3A-3E are schematic diagrams of a first implementation of an example cable cutter system 150 including a cutter wheel 300. The cable cutter system 150 is mounted to a surface of the vehicle, e.g., a fuselage 107 of the aircraft 101. The cutter wheel 300 can have a circumferential surface on which five cutting surfaces (e.g., a first cutting surface 302a, a second cutting surface 302b, a third cutting surface 302c, a fourth cutting surface 302d, and a fifth cutting surface 302e) are arranged equidistantly. The cutting surfaces are sharpened shear surfaces. The cutter wheel 300 can have more or fewer than five cutting surfaces. A space 306 between adjacent cutting surfaces is recessed (e.g., beveled) to receive the cable 160. In some implementations, the cutter wheel 300 is formed in a five-point star shape. The cutter wheel 300 includes a pivot position 304 about which the cutter wheel 300 rotates to cut the cable 160 received in the space 306. The pivot position 304 (e.g., a center of rotation of the cutter wheel 300) is located above a location of the recess 154 in the first cutting apparatus 152. The first cutting apparatus 152 includes multiple cutting surfaces, e.g., two cutting surfaces, in the recess 154. The pivot position 304 is behind a position in the recess 154 that provides a minimum clearance for the multiple cutting surfaces of the first cutting apparatus 152 to cut the cable 160. Such an alignment of the first cutting apparatus 152 and the cutter wheel 300 can create a shear on the cable 160 that promotes cutting as described below.

Figure 3A:
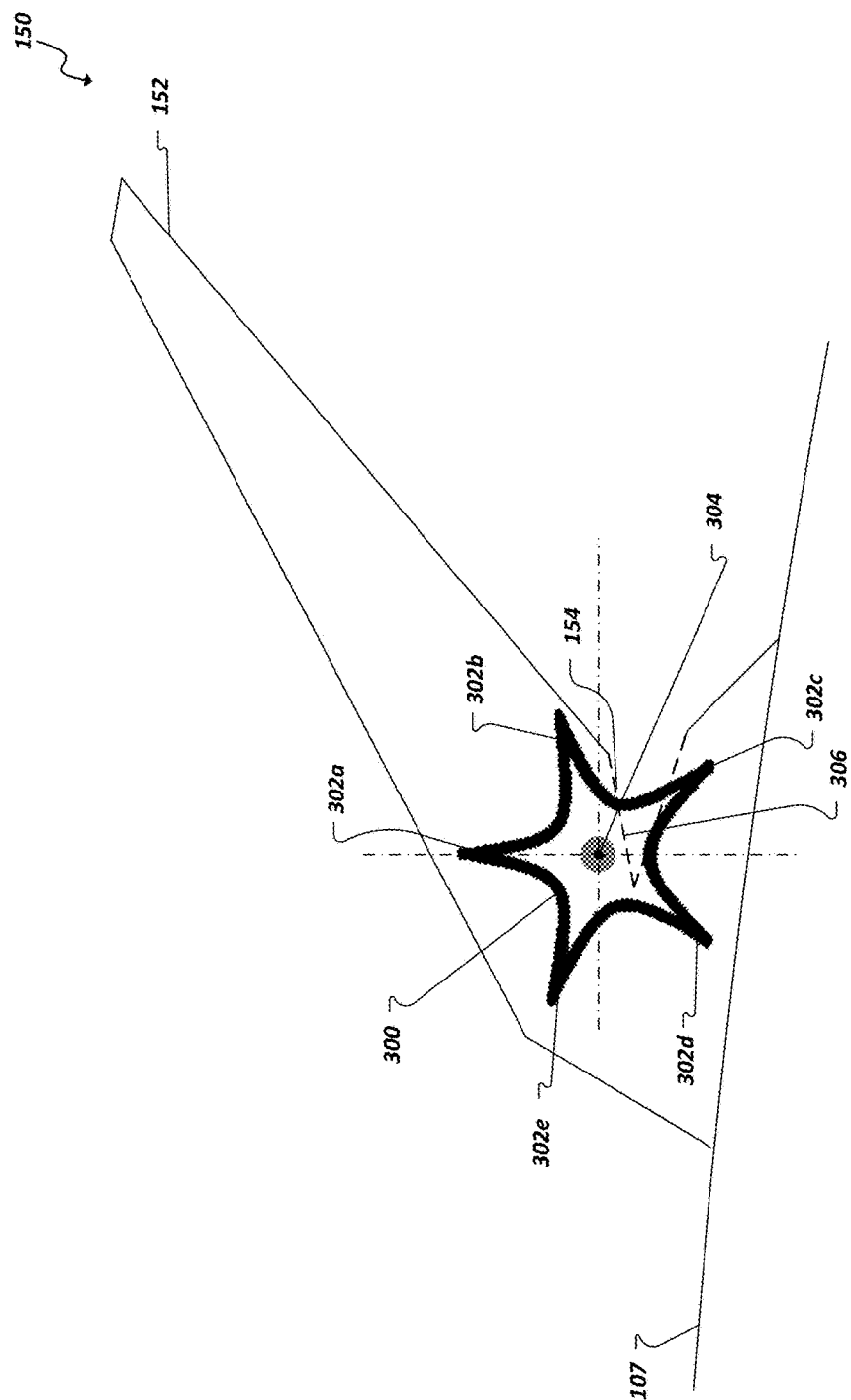
FIGS. 3A-3E are schematic diagrams of a first implementation of an example cable cutter system including a cutter wheel.
Figure 3B:
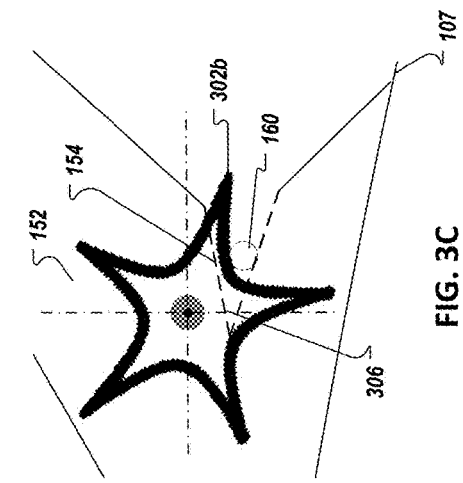
Figure 3C:
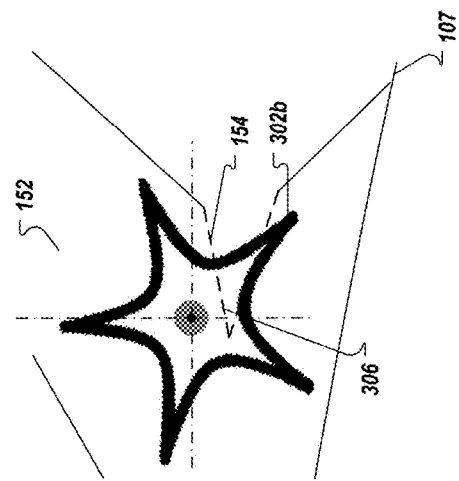

FIG. 3B is a schematic diagram of the cable 160 received in the cable cutter system 150. The guiding surface of the first cutting apparatus 152 guides the cable 160 towards the recess 154 of the first cutting apparatus 152 and the recess formed by adjacent cutting surfaces (e.g., the second cutting surface 302b and the third cutting surface 302c) of the cutter wheel. FIG. 3C is a schematic diagram of the cable 160 operating in cooperation with the first cutting apparatus 152 to cut the cable 160. As the aircraft 101 pushes against the cable 160, the load, represented by the forward momentum of the aircraft 101, is opposed by the tensile load of the cable 160. Because the cutter pivot position 304 is above the recess 154, the cutter wheel 300 rotates clockwise (i.e., the second cutting surface 302b moves downward) when the cable 160 enters the recess formed by the adjacent cutting surfaces. In this configuration, the cutting force (F) exerted by the second cutting surface 302b on the cable 160 is inversely proportional to sin Φ, where Φ represents an angle between the cutting force (F) and a vertical line passing through the pivot position 304. As the angle Φ decreases, e.g., to 0, the cutting force (F) increases, e.g., to ∞.

Figure 3D:
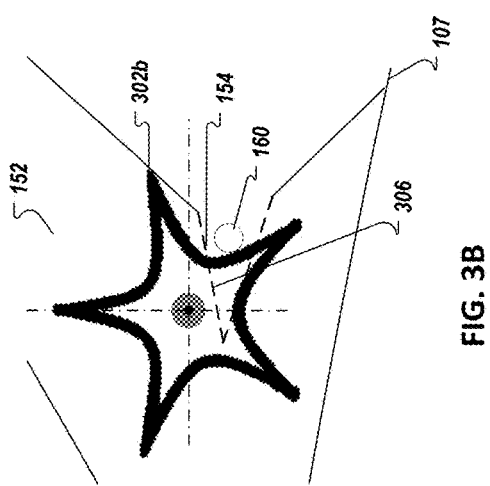
Figure 3E:
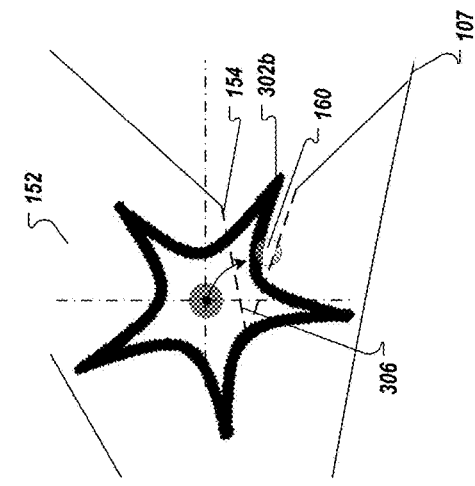

FIG. 3D is a schematic diagram of the cable 160 being cut by the two cutting apparatuses. A first cross-section of the cable 160 is cut by the multiple cutting surfaces in the recess 154 of the first cutting apparatus 152. A second cross-section of the cable 160, which is adjacent to the first cross-section, is cut by the second cutting surface 302b of the cutter wheel 300. As described above, the cutting force (F) on the cable 160 increases as the cutter wheel 300 rotates to cut the cable 160. Consequently, a forward momentum of the aircraft 101 does not decrease significantly relative to a cable cutter system that excludes the cutter wheel 300. Moreover, because the cutting force (F) on the cable 160 increases as the cutter wheel 300 rotates, a cable 160 having high ultimate stress, e.g., a large diameter cable, can be cut using the cable cutter system 150. FIG. 3E is a schematic diagram showing the cable 160 having been cut. After the cable 160 has been cut, the second cutting surface 302b traverses from above the recess 154 to below the recess 154. In some implementations, the second cutting apparatus can include a detent, e.g., a spring with a ball, connected to the cutter wheel 300 to ensure that a beveled region (e.g., a recess between the first cutting surface 302a and the second cutting surface 302b) is positioned to receive the next cable. The detent can prevent a spike formed by the cutting surfaces 302a from protruding in the open space.

Figure 4A:
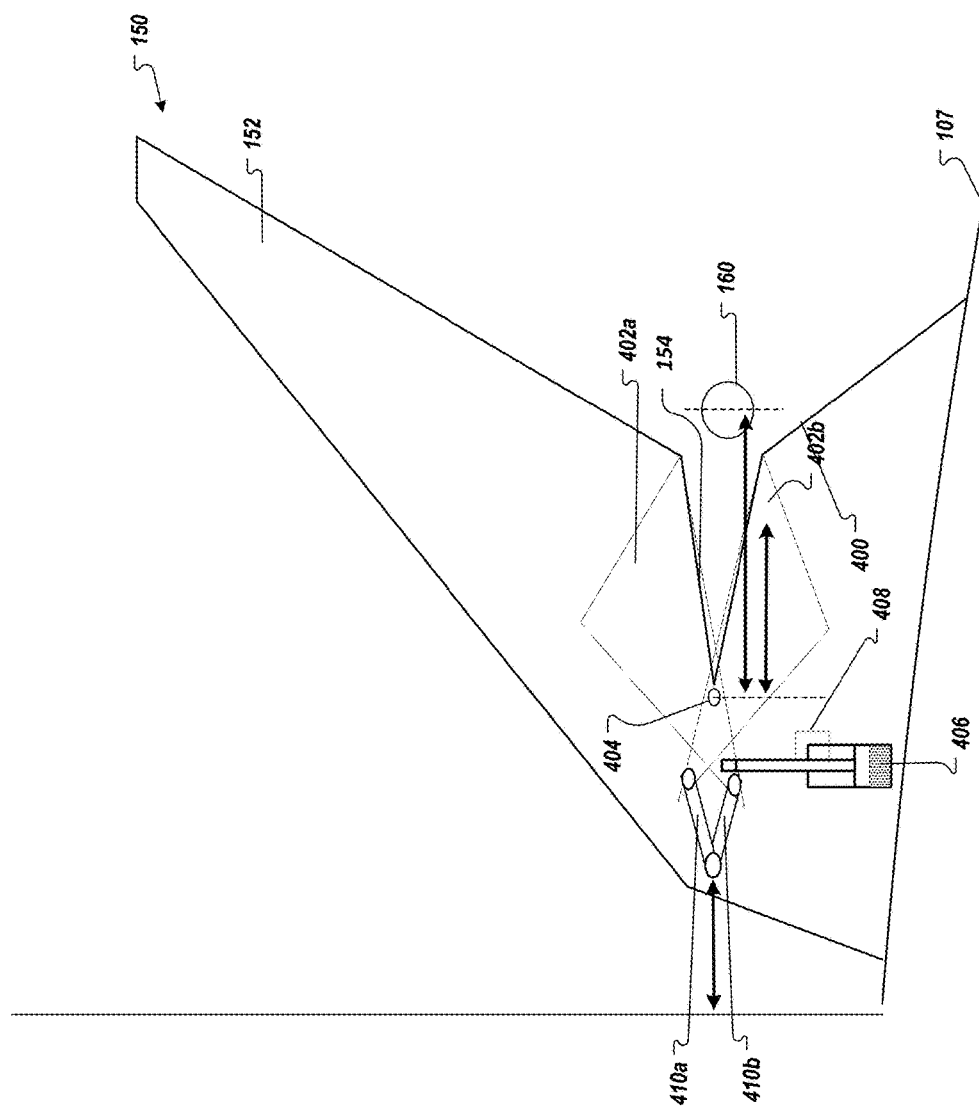
FIGS. 4A-4E are schematic diagrams of a second implementation of an example cable cutter system including cutting members.

FIGS. 4A-4E are schematic diagrams of a second implementation of an example cable cutter system 150 including cutting members, e.g., blades. The cable cutter system 150 is mounted to a surface of the vehicle, e.g., a fuselage 107 of the aircraft 101. FIG. 4A shows a schematic diagram of a second cutting apparatus 400 attached to the first cutting apparatus 152. The second cutting apparatus 400 includes a first cutting member 402a and a second cutting member 402b arranged to pivot about an axis 404 that is perpendicular to the first cutting apparatus 152. For example, the first cutting member 402a and the second cutting member 402b can be similar to blades of a pair of scissors. The second cutting apparatus 400 includes a spring member 406 attached to a position on a cutting member, e.g., the first cutting member 402a. In a default condition, e.g., when not cutting a cable 160, the spring member 406 can be in an energized state and be connected to a cutting member (e.g., either the first cutting member 402a or the second cutting member 402b). As described below, the spring member 406 can force the first cutting member 402a and the second cutting member 402b toward each other in response to the cable 160 being received between the first cutting member 402a and the second cutting member 402b.

Figure 4B:
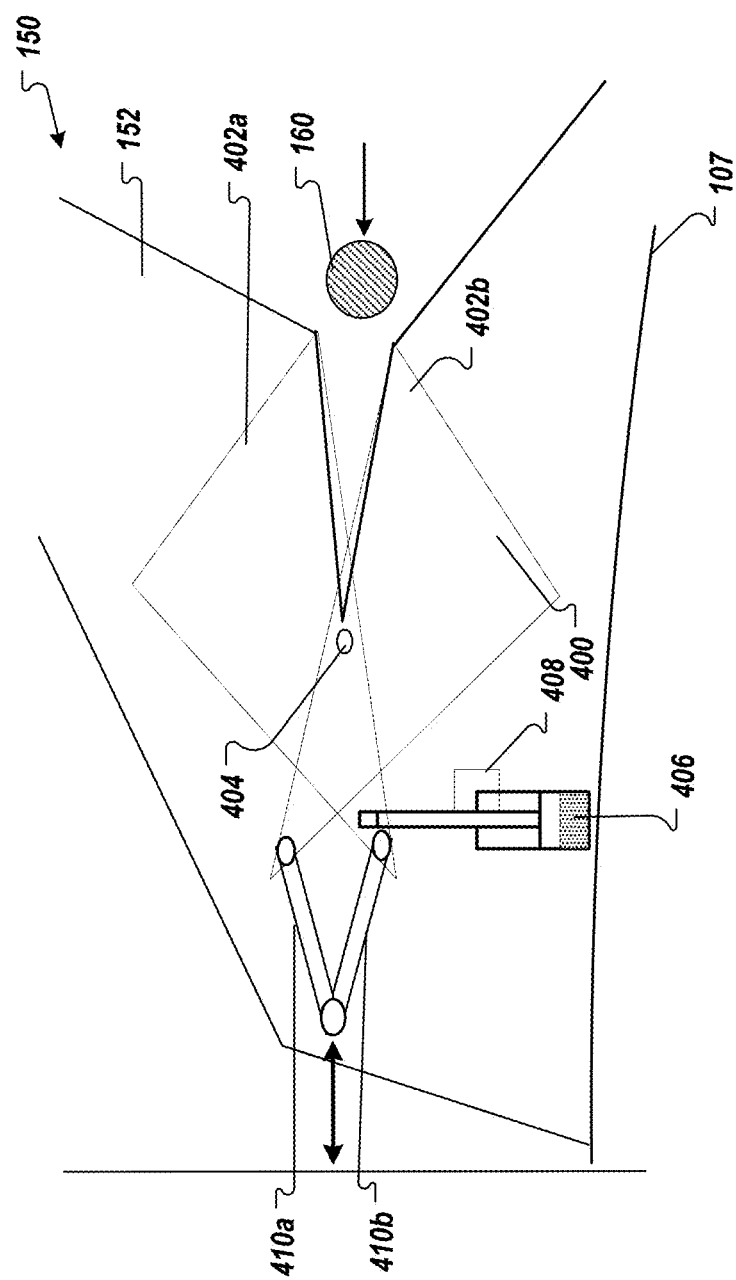
Figure 4C:
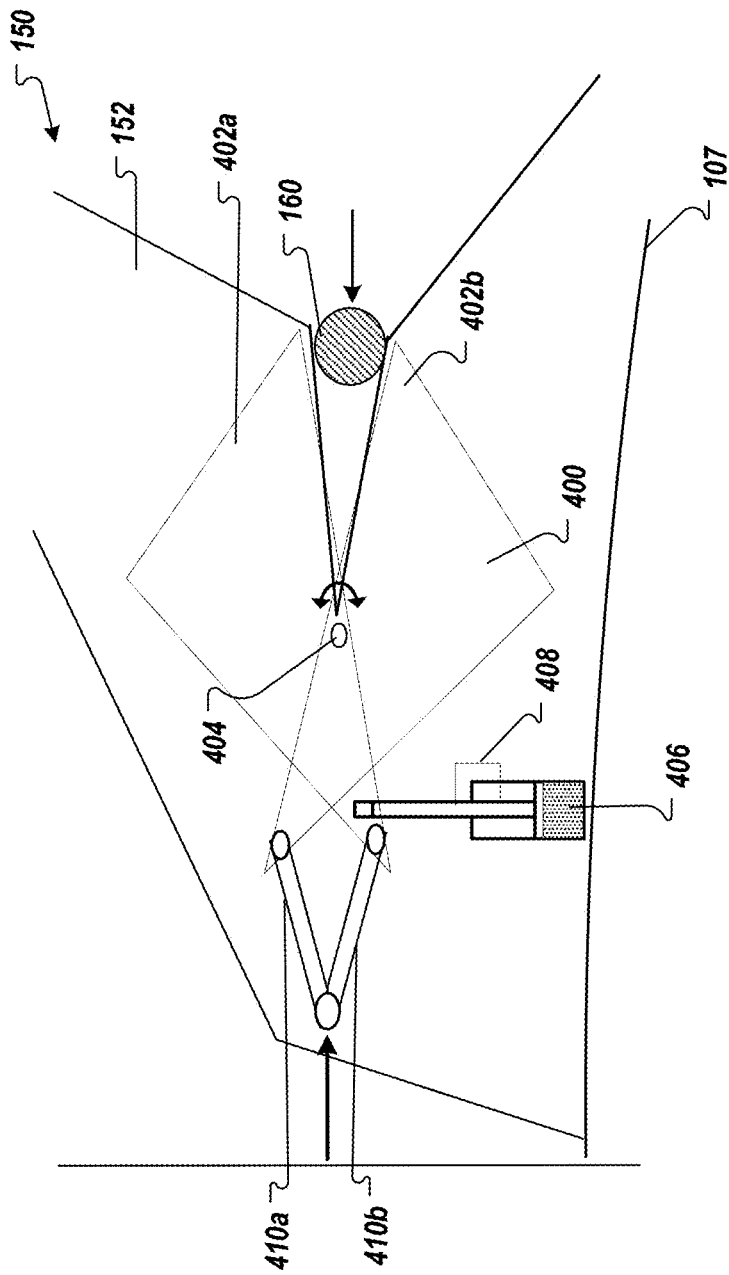

FIG. 4B shows a schematic diagram of the cable 160 approaching the recess 154 of the first cutting apparatus 152 and between the two cutting members of the second cutting apparatus 400. Prior to the cable 160 contacting the two cutting members of the second cutting apparatus, the spring member 406 is in an energized state. FIG. 4C shows a schematic diagram of the cable 160 being received in the recess 154 of the first cutting apparatus 152 and between the two cutting members of the second cutting apparatus 400. When the cable 160 contacts the second cutting apparatus 400, the spring member 406 is de-energized. In some implementations, the spring member 406 can include a trigger structure 408 to release the spring member 406 from the energized state to a de-energized state. For example, the spring member 406 can be enclosed in an enclosure that includes a notch that receives a seat on an outer surface of a rod that is connected to the first cutting member 402a. When the cable 160 is received between the two cutting members, the first cutting member 402a can exert a downward force on the rod. The downward force can cause the seat to be removed from the notch. The stored potential energy of the spring member 406 can then push the rod upward. When the trigger structure transfers the spring member 406 to the de-energized state, the spring member 406 pushes one cutting member toward the other. For example, if the spring member 406 is connected to the cutting member 402b, then the spring member 406 pushes the cutting member 402b upwards. Conversely, if the spring member 406 is connected to the upper cutting member 402a, then the spring member 406 pushes the cutting member 402a downwards.

Figure 4D:
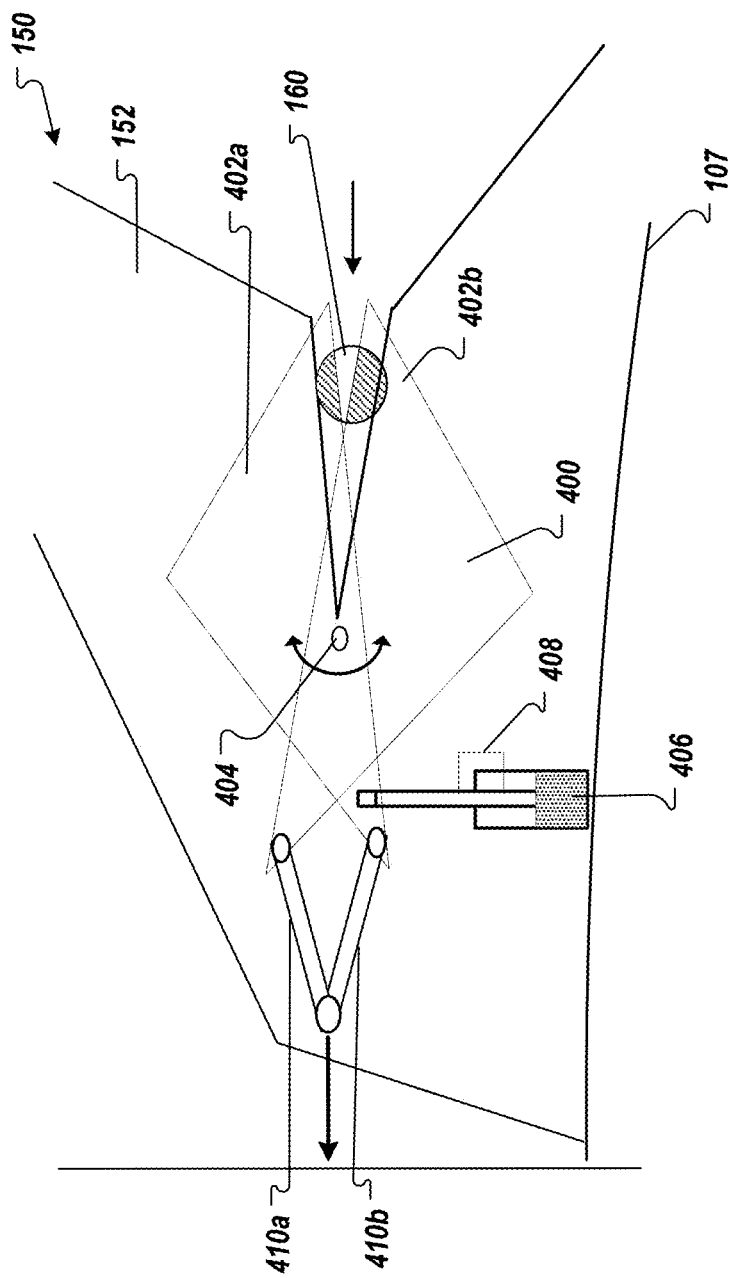
Figure 4E:
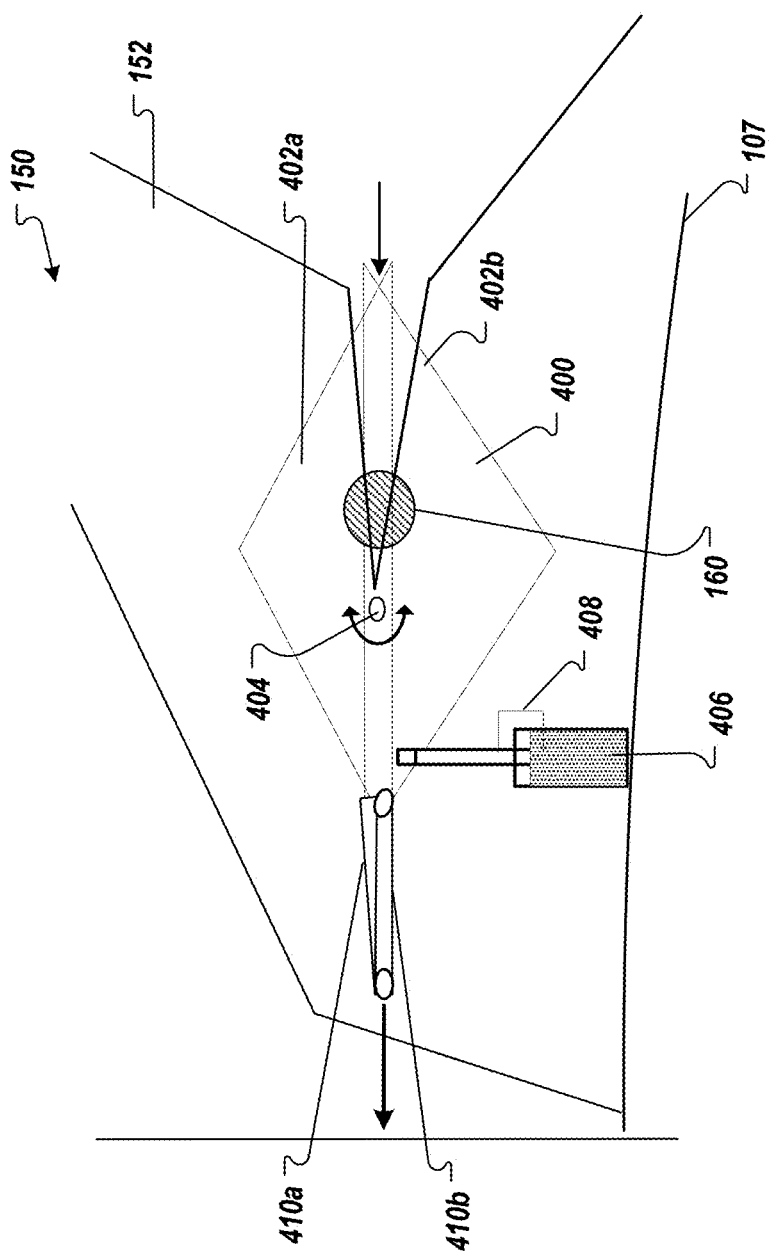

FIG. 4D shows a schematic diagram of the cable 160 being cut by the first cutting apparatus 152 and the second cutting apparatus 400. The cutting surfaces in the recess 154 of the first cutting apparatus 152 cut a first cross-section of the cable 160. The cutting members of the second cutting apparatus 400 cut a second cross-section of the cable 160, which is adjacent the first cross-section. The first cutting member 402a and the second cutting member 402b form a four bar mechanism with a first support bar 410a and a second support bar 410b. As an alternative to or in addition to the spring member 406 pushing the cutting members toward each other, the four bar mechanism can force the first cutting member 402a and the second cutting member 402b toward each other in response to the cable 160 being received between the first cutting member 402a and the second cutting member 402b. For example, the spring member 406 can be attached to the first cutting member 402a at a location at which the second support bar 410b is attached to the first cutting member 402a. Alternatively, the spring member 406 can be attached to the second cutting member 402b at a location at which the first support bar 410a is attached to the second cutting member 402b. In some implementations, the spring member 406 can be attached to either the first cutting member 402a or the second cutting member 402b away from the support bars and nearer to the location at which the cable 160 is received. FIG. 4E shows a schematic diagram of the second cutting apparatus 400 cutting the cable 160. The cutting members 402a and 402b are supported by the spring member 406 in the de-energized state, and the four bar mechanism operate in cooperation with the cutting surfaces of the first cutting apparatus 152 to cut the cable 160. Once the cable 160 has been cut, the tensile load of the cable 160 is no longer exerted on the second cutting apparatus 400. The spring member 406 can be returned to an energized state such that the first cutting member 402a and the second cutting member 402b are returned to the configuration shown in FIG. 4A.

A first distance can be defined between a pivot position of the second cutting apparatus 400 through which the axis 404 passes and the position on the first cutting member 402a to which the spring member 406 is attached ($L_{spr}$). A second distance can be defined between the pivot position and a center of the cable 160 ($L_{cable}$). A cutting force on the cable 160 can be controlled by varying a ratio between the first distance and the second distance. In the example described with reference to FIGS. 4A-4E, the two cutting members were pushed toward each other using a spring member. In some implementations, any structure, e.g., a pneumatic and/or hydraulic piston, which can exert a force to push one cutting member toward the other, can be used instead of or in addition to the spring member.

Figure 5:
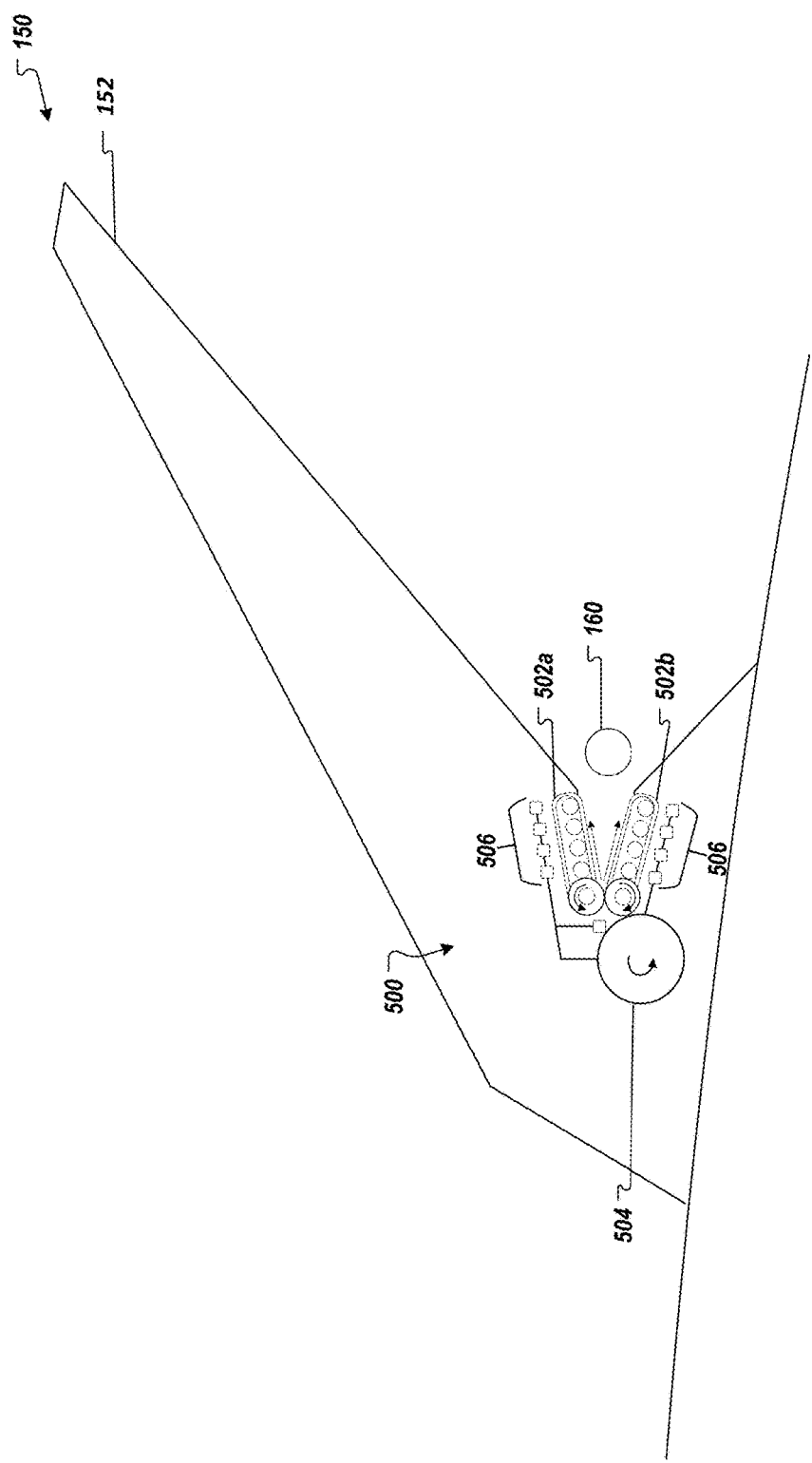
FIG. 5 is a schematic diagram of a third implementation of an example cable cutter system including cutting members.

FIG. 5 is a schematic diagram of a third implementation of an example cable cutter system 150 including a second cutting apparatus 500 having cutting members. The second cutting apparatus 500 operates in cooperation with the first cutting apparatus 150 to cut a cable 160 received in the recess of the first cutting apparatus 152. The second cutting apparatus 500 includes a first cutting member 502a having a first cutting surface and a second cutting member 502b having a second cutting surface. A space between ends of the two cutting members can determine a maximum diameter of the cable 160 that can be cut using the second cutting apparatus 500. The first cutting surface and the second cutting surface can continuously move to cut the cable. For example, each of the first cutting surface and the second cutting surface can include serrated edges arranged on a loop (e.g., a belt). The serrated edges can be continuously rotated (e.g., in a manner similar to a conveyor belt) in a direction of motion of the vehicle, e.g., the rotorcraft 101. In other words, the direction of rotation of each cutting surface can be opposite to a direction in which the cable 160 moves relative to the vehicle. Longitudinal load reduction to cut the cable 160 can be obtained by increasing the relative velocity between the second cutting apparatus 500 and the cable 160.

The second cutting apparatus 500 includes a movement generator 504 connected to the first cutting member 502a and the second cutting member 502b. The movement generator 504 can continuously move the first cutting surface and the second cutting surface in response to receiving the cable 160 between the first cutting member 502a and the second cutting member 502b. For example, the movement generator 504 can be an electric motor or a torsion spring wound to be in an energized state. Upon activation, the movement generator 504 can generate a rotational motion, which can be transferred to each cutting member, using a gear system. The second cutting apparatus 500 includes a sensor 506 connected to the first cutting member 502a or the second cutting member 502b or both. The sensor 506 can provide a signal to the movement generator 504 in response to receiving the cable 160 between the first cutting member 502a and the second cutting member 502b. For example, the sensor 506 can include a piezoelectric device array having multiple piezoelectric devices. The sensor 506 can detect a contact on the first cutting member 502a or the second cutting member 502b (or both) made by the cable 160 upon being received between the two cutting members. In response to detecting the contact, the sensor 506 can generate and transmit a signal to the movement generator 504.

In a default state, the cutting members of the second cutting apparatus 500 are stationary, i.e., not rotating. In operation, the guide surface of the first cutting apparatus 152 guides the cable 160 into the recess. The cutting surfaces in the recess cut a first cross-section of the cable 160. The cable 160 contacts either the first cutting member 502a or the second cutting member 502b (or both). The sensor 506 senses the contact and, in response to the contact, generates and transmits a signal to the movement generator 504. In response to receiving the signal, the movement generator 504 causes the cutting members to move. For example, where the movement generator 504 is a torsion spring, the torsion spring de-energizes and rotates in response to receiving the signal from the sensor 506. A rotational energy from the torsion spring is transferred to the cutting members, which rotate. In another example in which the movement generator 504 is an electric motor, the motor provides power to rotate the cutting members. A speed at which the cutting members move can be set as a function of a forward velocity of the vehicle, e.g., the aircraft 101. A second cross-section of the cable 160, which is adjacent the first cross-section that is being cut by the cutting surfaces of the first cutting apparatus 152, is cut by the second cutting apparatus 500. The movement generator 504 can continue to move the cutting members after the cable 160 has been cut. Alternatively, after the cable 160 has been cut, the sensor 506 can stop transmitting the signal generated responsive to the contact by the cable 160. The movement generator 504 can stop providing power to the cutting members in response to not receiving the signal. In the example in which the movement generator 504 is a torsion spring, the cutting members can stop receiving power that is sufficient to cause the cutting members to rotate when the torsion spring has expended the stored energy when returning from an energized state to a de-energized state. In such implementations, an electric motor can be connected to the torsion spring to wind the torsion spring to the energized state for re-use.

Figure 6:
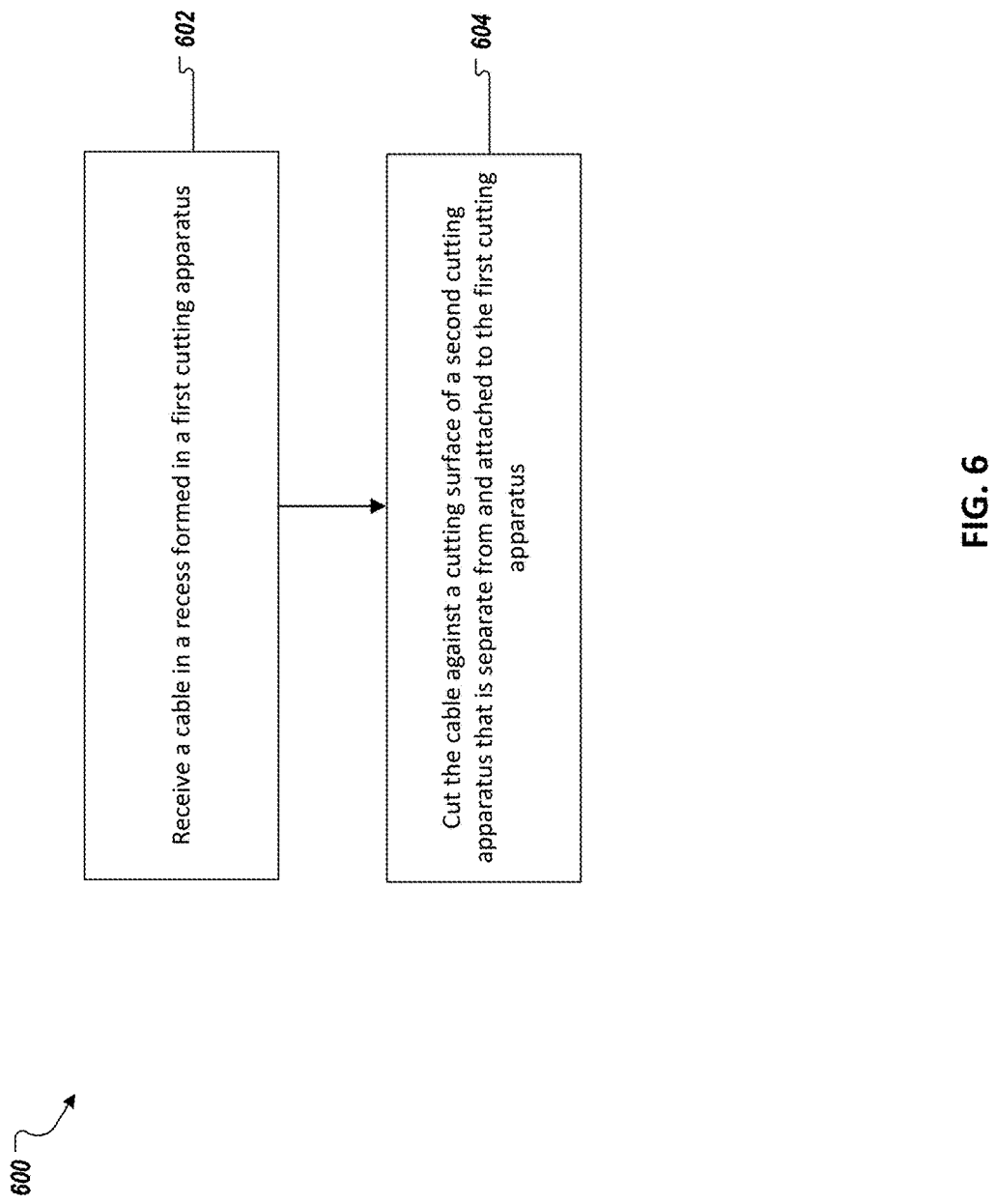
FIG. 6 is a flowchart of an example process for operating the example cable cutter system.

FIG. 6 is a flowchart of an example process 600 for operating the example cable cutter system. The process 600 can be implemented by any of the cable cutter systems including a first cutting apparatus and a second cutting apparatus described above. At 602, a cable is received in a recess formed in a first cutting apparatus. At 604, the cable is cut against a cutting surface of a second cutting apparatus that is separate from and attached to the first cutting apparatus.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A cable cutting system for a vehicle comprising: a first cutting apparatus comprising a recess to receive a cable and a second cutting apparatus separate from and attached to the first cutting apparatus at a pivot position located behind the recess of the first cutting apparatus; the second cutting apparatus comprising a first cutting member and a second cutting member arranged to pivot at the pivot position about an axis that is perpendicular to the first cutting apparatus; wherein at least one of the first and second cutting members has a first cutting surface capable of being positioned in the recess, wherein the recess is disposed between a first guiding surface and a second guiding surface formed on said first cutting apparatus, and the first guiding surface is affixed to a surface of the vehicle.

2. The system of claim 1, wherein the second cutting apparatus comprises a plurality of cutting surfaces formed respectively on the first and second cutting members and capable of being positioned in the recess.

3. The system of claim 1, further comprising a spring member in an energized state connected to the first cutting member, the spring member to force the first cutting member and the second cutting member toward each other in response to the cable being received between the first cutting member and the second cutting member.

4. The system of claim 3, wherein the first cutting member is arranged above the second cutting member and the spring member is connected to the second cutting member.

5. The system of claim 3, wherein the first cutting member and the second cutting member form a four bar mechanism with a first support bar and a second support bar to force the first cutting member and the second cutting member toward each other in response to the cable being received between the first cutting member and the second cutting member.

6. The system of claim 5, wherein the spring member comprises a trigger structure to release the spring member from the energized state to a de-energized state.

7. A method to cut a cable encountered by a vehicle comprising: providing a cable cutting system comprising a first cutting apparatus and a second cutting apparatus, the first cutting apparatus comprising a recess to receive a cable and the second cutting apparatus including at least one cutting surface capable of being positioned in the recess, wherein the recess is disposed between a first guiding surface and a second guiding surface of the first cutting apparatus, and the first guiding surface is affixed to a surface of the vehicle, the second cutting apparatus separate from and attached to the first cutting apparatus at a pivot position located behind the recess of the first cutting apparatus, and the second cutting apparatus comprising a first cutting member and a second cutting member arranged to pivot at the pivot position about an axis that is perpendicular to the first cutting apparatus wherein the at least one cutting surface is formed on at least one of the first and second cutting members; the method further including the steps of receiving the cable in the recess formed in the first cutting apparatus; and cutting the cable using the second cutting apparatus.

8. The method of claim 7, further comprising applying a force on the cutting surface of the second cutting apparatus to cut the cable.

9. The method of claim 7, wherein the second cutting apparatus includes a plurality of cutting surfaces, one cutting surface formed on each of the first and second cutting members, further comprising cutting the cable using the plurality of cutting surfaces positioned in the recess of the first cutting apparatus.

10. The method of claim 7, wherein cutting the cable using the second cutting apparatus further comprises forcing the first cutting member and the second cutting member toward each other using a spring member in an energized state connected to the first cutting member.

11. The method of claim 10, further comprising releasing the spring member from the energized state to a de-energized state using a trigger structure.

12. The method of claim 10, further comprising returning the spring member to the energized state after the cable is cut.

13. The method of claim 7, wherein cutting the cable using the second cutting apparatus further comprises forcing the first cutting member and the second cutting member toward each other, wherein the first cutting member and the second cutting member form a four bar mechanism with a first support bar and a second support bar.

* * * * *